United States Patent [19]

Matsui et al.

[11] 4,436,255
[45] Mar. 13, 1984

[54] SEATBELT RETRACTOR

[75] Inventors: Kenji Matsui, Higashikamo; Fuminori Teraoka, Nishikamo, both of Japan

[73] Assignee: Kabushiki Kaisha Tokai-Rika-Denki-Seisakusho, Aichi, Japan

[21] Appl. No.: 339,707

[22] Filed: Jan. 15, 1982

[30] Foreign Application Priority Data

Jan. 20, 1981 [JP] Japan .............................. 56-7152[U]

[51] Int. Cl.³ ........................ A62B 35/02; B65H 75/48
[52] U.S. Cl. .............................................. 242/107.4 A
[58] Field of Search ................. 242/107.4 R–107.4 E, 242/107.6, 107.7; 280/806; 297/478

[56] References Cited

U.S. PATENT DOCUMENTS

| | | | |
|---|---|---|---|
| 3,632,058 | 1/1972 | Stoffel | 242/107.4 B |
| 4,090,735 | 5/1978 | Czernakowski | 242/107.4 A X |
| 4,106,722 | 8/1978 | Inukai et al. | 242/107.7 |
| 4,327,882 | 5/1982 | Frankila et al. | 242/107.4 A |

*Primary Examiner*—John M. Jillions
*Attorney, Agent, or Firm*—Parkhurst & Oliff

[57] ABSTRACT

A seatbelt retractor for use in a motor vehicle to retract a passenger restraining seatbelt to be fastened around an occupant. The seatbelt is wound around a rotatable takeup shaft in layers by a biasing force in the seatbelt retractor. Fixed on the takeup shaft is a ratchet wheel, and a pawl is opposed to the ratchet wheel, whereby when the pawl meshes with the ratchet wheel, and thereby stops the belt-unwinding rotation of the takeup shaft. An inertia lock mechanism is provided in the retractor to actuate the pawl to mesh with the ratchet wheel in a vehicular emergency situation. A cam mechanism is also provided in the retractor, which includes a cam member or ring rotated by the takeup shaft and a follower member or linear spring driven by the cam member and opposed to the pawl. The cam member actuates the follower member to move the pawl into engagement with the ratchet wheel when the seatbelt is unwound more than a predetermined value, namely a value necessary for the fastening of the seatbelt. When the seatbelt is unwound within the predetermined value from the takeup shaft, the takeup shaft is kept rotatable in either direction and its belt-unwinding rotation is stopped by the inertia lock mechanism during a vehicular emergency situation. When the seatbelt is unwound more than the predetermined value, the takeup shaft is automatically stopped in its belt-unwinding rotation by the cam mechanism.

14 Claims, 12 Drawing Figures

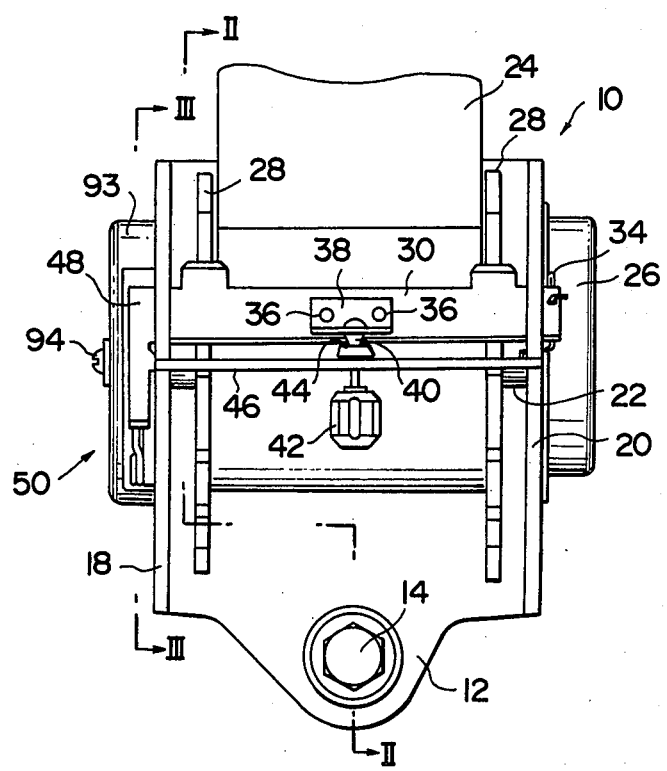

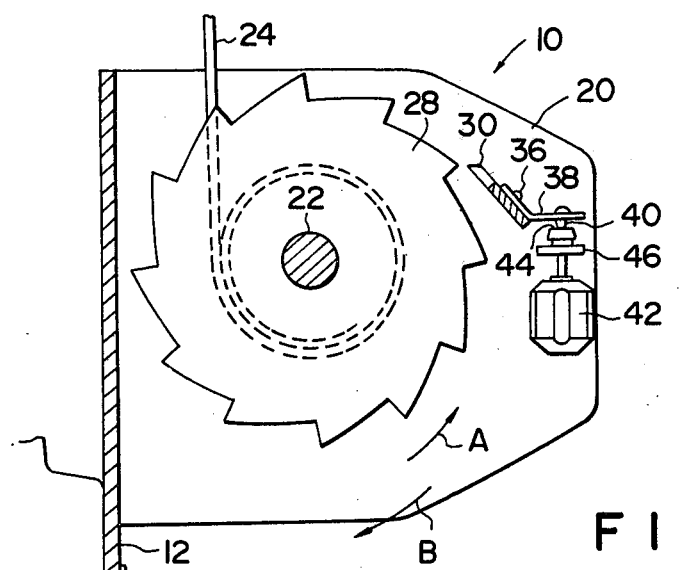
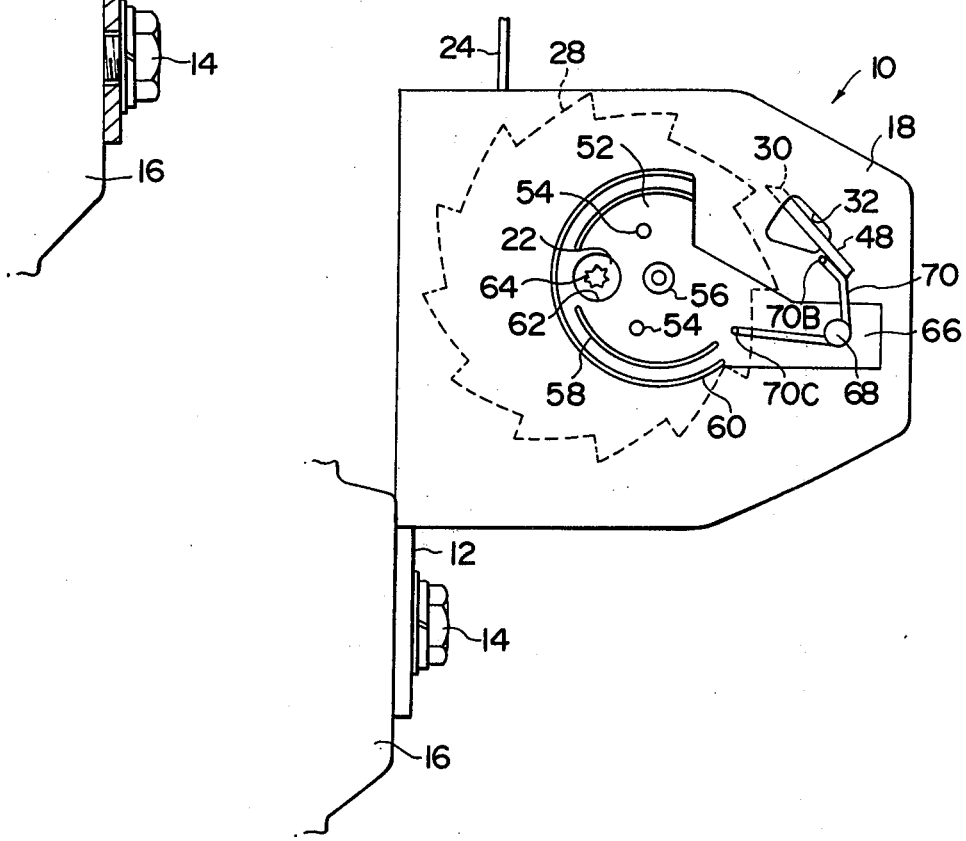

SEATBELT RETRACTOR

BACKGROUND OF THE INVENTION

1. Field of the Invention

This invention relates to a seatbelt retractor, and more particularly to a seatbelt retractor for use in a seatbelt system in a motor vehicle and for retracting a seatbelt which restrains an occupant in the vehicle.

2. Description of the Prior Art

The seatbelt retractor for use in a seatbelt system in a motor vehicle is generally to retract one end of a restraining seatbelt by a biasing force and house the seatbelt therein.

Among various types of seatbelt retractors, a seatbelt retractor with an automatic stop mechanism for stopping the further unwinding of the seatbelt after the occupant fastens his seatbelt is advantageous in that the retractor definitely restrains the occupant with the stop mechanism. However, there are, in return, disadvantages, where even in a normal situation, the seatbelt is gradually retracted by a ratchet mechanism in the stop mechanism to thereby overrestrain the occupant and deteriorate the comfort of the occupant.

There is also another type of seatbelt retractor, which includes an inertia lock mechanism for stopping the unwinding of the seatbelt by way of sensing a vehicular emergency situation by an acceleration sensor. This type of seatbelt retractor is advantageous in that the occupant is not overrestrained by the seatbelt in a normal situation, but disadvantageous in that the seatbelt cannot secure any packages, special seats for infants or the like onto an occupant's seat. More specifically, acceleration, to the extent that the inertia lock mechanism does not operate or simple movements of the infant seated cause the unwinding of the seatbelt from the retractor, whereby the packages or infant may fall down from the seat.

Another type of seatbelt retractor exists, which includes a manual lock mechanism whereby the above inertia lock mechanism can be manually operated to stop the unwinding of the seatbelt. The manual lock mechanism includes a lever to be manually operated, which is disposed in a narrow space such as under the seats, with the manual lock mechanism attached to the retractor. As a result, the manual lock mechanism with the lever is difficult to be handled. It is necessary for this type of seatbelt retractor to dispose connecting instruments such as wires in order to remotely operate the manual lock mechanism.

SUMMARY OF THE INVENTION

Therefore, it is an object of the present invention to obviate the abovedescribed disadvantages and to provide a unique seatbelt retractor which is able to either stop the further unwinding of the seatbelt after the occupant fastens his seatbelt, or stop the unwinding of the seatbelt only in a vehicular emergency situation, as the occasion demands.

To achieve the above object, the seatbelt retractor according to the present invention includes a unique cam mechanism. The cam mechanism contains a cam member rotated by a takeup shaft around which a seatbelt is wound and a follower member driven by the cam member. The follower member is opposed to a pawl for stopping the belt-winding rotation of the takeup shaft via a ratchet wheel fixed on the takeup shaft. The cam member actuates the follower member moving the pawl into engagement with the ratchet wheel when the seatbelt is unwound more than a predetermined value from the takeup shaft. An acceleration sensing means or inertia lock mechanism is provided in opposition to the pawl to stop the belt-unwinding rotation of the takeup shaft in a vehicular emergency situation. When the seatbelt is unwound within the predetermined value from the takeup shaft, the takeup shaft is kept rotatable in either direction; however, this belt-unwinding rotation is stopped from further belt-unwinding rotation by the acceleration sensing means in a vehicular emergency situation. When the seatbelt is unwound more than the predetermined value, the takeup shaft is automatically stopped by the cam mechanism. As a result, the seatbelt can be used to secure packages or an infant on the additional seat of the vehicle.

BRIEF DESCRIPTION OF THE DRAWING

FIG. 1 is a front view showing a first embodiment of a seatbelt retractor according to the present invention;

FIG. 2 is a sectional view taken along the line II—II in FIG. 1;

FIG. 3 is a sectional view taken along the line III-—III in FIG. 1 without a dust cover and cam ring;

DESCRIPTION OF THE PREFERRED EMBODIMENTS

Figure 4:
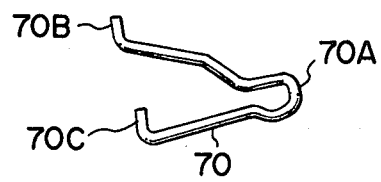
FIG. 4 is a perspective view showing a linear spring.

In FIGS. 1 through 3, a seatbelt retractor 10 of a first embodiment according to the present invention is fixed onto a vehicle body 16 by attaching means connecting the retractor to a frame 12 by way of a bolt 14.

A pair of brackets 18 and 20 extending from both ends of the frame 12 in parallel, where substantially opposite ends of a takeup shaft 22 are rotatably supported. An occupant restraining webbing or seatbelt 24 is wound around the central portion of the takeup shaft 24 in layers. The other end of the seatbelt, though not shown, is connected to the other part of the vehicle body through a tongue plate, buckle, and so forth, so that the intermediate portion of the seatbelt is placed over an occupant.

One end of the takeup shaft 22 protrudes from the bracket 20 and a coil spring retracting device 26 is disposed between the end of the takeup shaft 22 and the bracket 20, thereby biasing the takeup shaft 22 in the retracting direction of the seatbelt (in the direction of arrow A).

A pair of ratchet wheels 28 are fixed on the takeup shaft 22 to rotate with the takeup shaft 22 with such a placement that the seatbelt 24 is placed there between. A pawl 30 is opposed to the ratchet wheels 28 to constitute a lock mechanism. Opposite ends of the pawl 30 protrude from the brackets 18 and 20 through supporting holes 32 which are substantially triangular shaped and formed in the brackets 18. Interposed between one of the protruding ends of the pawl 30 and the bracket 20 is a linear spring 34 to bias and keep the pawl 30 apart from the ratchet wheels 28 as shown in FIG. 2. When the pawl 30 is rotated against the biasing force of the linear spring 34, the pawl 30 meshes with the ratchet wheels 28 and stops the belt-unwinding rotation of the takeup shaft 22 (in the direction of arrow B). As an alternative, the pawl 30 may be so designed that the pawl 30 is biased to be apart from the ratchet wheels 28.

A lever 38 at one end thereof is fixed onto the intermediate portion of the pawl 30 through rivets 36, and at the other end thereof is a projection 40, which is placed on a top surface 44 of a pendulum 42. The pendulum 42 is perpendicularly hung down from a bracket 46 extending between the aforementioned brackets 18 and 20. The pendulum 42, therefore, functions as an acceleration sensor. Namely, it swings to push up the lever 38 if the vehicle is accelerated more than a predetermined value, thereby rotating the pawl 30 aganst the biasing force of the linear spring 34 to mesh with the ratchet wheels 28 and thereby stopping the belt-unwinding rotation of the takeup shaft.

The acceleration sensor is not limited to be the above pendulum 42, but can be another type of acceleration sensor which is rotatable upon sensing the vehicular acceleration, or which can rotate the pawl 30 upon sensing the abrupt unwinding rotation of the takeup shaft 22.

The other end of the pawl 30 penetrates the bracket 18 through the hole 32 to a force-receiving plate 48 extending perpendicular to the longitudinal direction of the pawl 30. The plate 48 is opposed to a control mechanism 50, which functions to rotate the pawl 30 for interlocking with the ratchet wheels 28 when the seatbelt 24 is unwound from the takeup shaft 22 more than a predetermined value, thereby automatically stopping the unwinding rotation of the takeup shaft.

As shown in FIG. 3, the control mechanism 50 includes a guide plate 52 mounted on the outer side of the bracket 18 by rivets 54. The guide plate 52 has an inner wall 58 and outer wall 60 of about two-thirds concentric circular arcs around a boss 56, from which walls 58 and 60 project outwardly from the bracket 18.

The guide plate 52 has also a round hole 62 offset from the boss 56, into which hole the other end of the takeup shaft 22 is inserted. Coaxially fixed on this end of the takeup shaft 22 is a pinion 64, which is rotatable with the takeup shaft 22. A part of the guide plate 52 extends toward the pawl 30 to be an extended portion 66 adjacent to the force-receiving plate 48 and a pin 68 is fixed on the extended portion 66. A substantially V-shaped linear spring 70 which functions as a follower member for a cam mechanism is rotatably coupled around the pin 68 at the intermediate circular arc portion 70A thereof as also shown in FIG. 4. Both ends of the spring 70 are perpendicularly bent to be bent portions 70B and 70C, respectively, and the bent portion 70B is opposed to the force-receiving plate 48 of the pawl 30. Therefore, if the linear spring 70 rotates around the pin 68 in a clockwise direction in FIG. 3, the bent portion 70B rotates the pawl 30 in a counter-clockwise direction in FIG. 3 through pushing the force-receiving plate 48, whereby the pawl meshes with the ratchet wheels 28.

Figure 5:
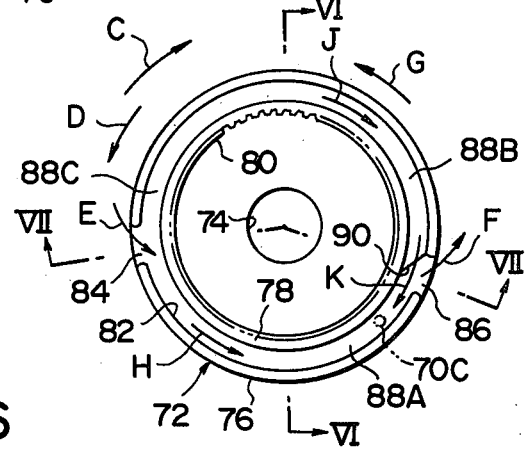
FIG. 5 is a front view showing a cam ring.
Figure 6:
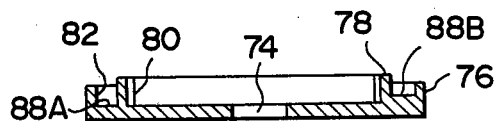
FIG. 6 is a sectional view taken along the line VI—VI in FIG. 5.
Figure 7:
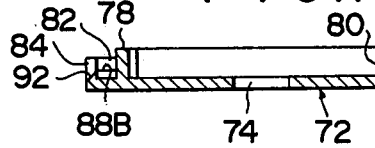
FIG. 7 is a sectional view taken along the line VII-—VII in FIG. 5.

As shown in FIGS. 5 through 7, the control mechanism 50 has a cam member or ring 72 which constitutes a cam mechanism together with the aforementioned linear spring 70. The cam ring 72 as a whole is disk-shaped, and has a round center hole 74 to be set onto the boss 56 of the guide plate 52. The outer periphery of the cam ring 72 projects in an axial direction thereof to be an outer ring 76, which is adapted to be inserted between the inner and outer walls 58 and 60 of the guide plate 52. At the inner side of the outer ring 76, the said cam ring 72 has an inner ring 78 projecting more in the axial direction than the outer ring 76 and concentrially with the outer ring 76. The inner ring 78 is adapted to be inserted into the inner wall 58 of the guide plate 52 contacting with the inner peripheral surface of the inner wall 58. The inner ring 78 is provided at the inner peripheral surface thereof with an internal gear 80 meshing with the pinion 64 of the takeup shaft 22, so that the rotation of the takeup shaft 22 is transmitted at a reduced rate to the cam ring 72. More specifically, when the takeup shaft rotates in the belt-winding or retracting direction (in the direction of arrow A), the cam ring 72 is rotated in a clockwise direction in FIG. 5 (in the direction of arrow C). On the contrary, when the takeup shaft rotates in the belt-unwinding direction (in the direction of arrow B), the cam ring 72 is rotated in a counter-clockwise direction in FIG. 5 (in the direction of arrow D).

A gutter 82 between the inner and outer rings 76 and 78 of the cam ring 72 is opposed to the bent portion 70C of the linear spring 70, and the outer ring 76 of the cam ring 72 is cut off at two different portions to form an inlet portion 84 and outlet portion 86 respectively for the bent portion 70C of the linear spring 70. Namely, the bent portion 70C is introduced into the gutter 82 through the inlet portion 84 (in the direction of arrow E), and is led out from the gutter 82 through the outlet portion 86 (in the direction of arrow F). Therefore, the gutter 82 functions as a first guide portion for the bent portion 70C where the linear spring 70 does not push the pawl 30 to mesh with the ratchet wheels 28, but allows the pawl 30 to mesh with the ratchet wheels 28 by the inertia lock mechanism. The outer periphery of the outer ring 76 functions as a second guide portion for the bent portion 70C where the linear spring 70 positively pushes the pawl 30 to mesh with the ratchet wheels.

The depth of the gutter 82 of the cam ring 72 varies along the circular longitudinal direction thereof. A deep bottom surface 88A of the gutter 82 extends substantially from the outlet portion 86 to the inlet portion 84 in a clockwise direction of FIG. 5, while a shallow bottom surface 88B extends substantially from the outlet portion 86 to the inlet portion 84 in a counter-clockwise direction of FIG. 5. Both bottom surfaces 88A and 88B meet each other adjacent to the outlet portion 86 via a step portion 90 where the depth of the gutter 82 abruptly changes, and are adjacent to the inlet portion 84 via a sloping bottom surface 88C where the depth of the gutter 82 gradually changes. At the border between the sloping bottom surface 88C and the inlet portion 84, as shown in FIG. 7, a bottom surface 92 of the inlet portion 84 is higher in level than the sloping bottom surface 88C, and the bottom surface 92 is tapered down toward the outer periphery of the outer ring 76. Therefore, when the cam ring rotates in the direction of arrow C, the bent portion 70C of the linear spring 70 enters through the inlet portion 84 as shown by arrow E into the gutter 82 and reaches the bottom surface 88A as shown by arrow H. Then, the cam ring rotates in the direction of arrow D, which causes the bent portion 70C to move in the direction of arrow J, pass the step portion 90, and drop down to the bottom surface 88A as shown by arrow K. Then, the cam ring rotates in the direction of arrow C, which causes the bent portion 70C to pass through the outlet potion 86 as shown by arrow F to the outer periphery of the outer ring 76. The bent portion 70C, upon further rotation of the cam ring 72 in the direction of arrow C, namely in the belt-unwinding rotation of the takeup shaft, moves toward the inlet portion 84 along the outer periphery of the outer ring 76 as shown by arrow G, and then again enters into the gutter 82 as shown by arrow E.

When the bent portion 70C is in the gutter 82, the other bent portion 70B of the linear spring 70 is either in a slight contact with the force-receiving plate 48 of the pawl or slightly spaced away from the force-receiving plate 48 as shown in FIG. 3. When the bent portion 70C is at the outer periphery of the outer ring 76, the bent portion 70B pushes the force-receiving plate 48 to rotate the pawl 30 into meshing with the ratchet wheels 28, thereby performing an automatic stop-unwinding state where the seatbelt is automatically stopped from unwinding.

In order to secure the movement of the bent portion 70C, the linear spring 70 is designed such that the bent portion 70C is biased toward the bottom surface of the gutter 82, namely in the direction of receding from the bracket 18. Furthermore, although the linear spring 70 is also designed to facilitate the entering of the bent portion 70C through the inlet portion 84 into the gutter 82 by a biasing force as shown by arrow E, the linear spring 70 can be free from any force and does not push the pawl 30 once the bent portion 70C is in the gutter 82. The relative placement between the cam ring 72 and the takeup shaft 22 is such that when the seatbelt 24 is wound around the takeup shaft to a maximum extent, the bent portion 70C is located on the bottom surface 88A. When the seatbelt is wound to an extent more than a value necessary to fasten the seatbelt 24 around the passenger, the bent portion 70C falls down onto the bottom surface 88A from the bottom surface 88B through the step portion 90.

As for assembling the above-mentioned elements, the cam ring 72 is assembled to the guide plate 52 by coupling the round hole 74 of the cam ring with the boss 56 of the guide plate, then covering the cam ring 72 with a dustcover 93. Assembly occurs by screwing down the dust cover to the boss 56 by a screw 94.

In operation, when the seatbelt 24 is not fastened around the passenger, most of the seatbelt is wound around the takeup shaft 22 and the bent portion 70C of the linear spring 70 is on the bottom surface 88A of the cam ring 72 as shown in FIG. 5. Therefore, since the bent portion 70B of the linear spring 70 does not give any biasing force to the pawl 30, the pawl 30 is apart from the ratchet wheels by the biasing force of the other linear spring 34, whereby the takeup shaft 22 is rotatable in the belt-unwinding direction.

When the occupant grabs and pulls out the seatbelt from the takeup shaft 22, the cam ring 72 rotates in the direction of arrow D in FIG. 5 through the pinion 64 and the internal gear 80, which causes the bent portion 70C to move from the bottom surface 88A through the sloping bottom surface 88C up to the bottom surface 88B. The cam ring 72, however, does not rotate further to move the bent portion 70C to the step portion 90 during the normal belt-fastening operation by the occupant. In these instances the bent portion 70C does not get out of the gutter 82. As a result, the occupant is able to fasten his seatbelt without any special effort and is free to change his driving posture during a normal running situation because the takeup shaft 22 is freely rotatable.

In a vehicular emergency situation such as a collision, the pendulum 42 as an acceleration sensor and swings to mesh the pawl 30 with the ratchet wheels 28 via the lever 38, whereby the belt-unwinding rotation of the takeup shaft 22 is suddenly stopped so that the seatbelt restrains the occupant safely. In view of the above, the seatbelt does not put the occupant under a large amount of pressure in a normal running situation, but restrains the occupant safely in an emergency situation.

If it is necessary to secure a package or additional seat for infants onto the seat by the seatbelt, the present invention functions to hold the package or infant in the seat and prevent falling out of the seat due to the movement of the package or child to the extent that the acceleration sensor is not operated. More specifically, if the occupant unwinds the seatbelt 24 from the takeup shaft 22 to a great extent, for example, almost all of it, the cam ring 72 rotates in the direction of arrow D in FIG. 5 and moves the bent portion 70C from the bottom surface 88B through the step portion 90 up to the bottom surface 88A. Upon belt-winding rotation of the takeup shaft thereafter, the bent portion 70C, as shown by arrow F, gets out from the gutter through the outlet portion 86 to the outer periphery of the outer ring 76. Therefore, the linear spring 70 pushes the pawl 30 to mesh with the ratchet wheels, whereby the takeup shaft is allowed to rotate in the belt-winding or retracting direction, but prevented from rotating in the belt-unwinding direction. As a result, the seatbelt secures the package or so onto the seat regardless of acceleration of the vehicle.

If the seatbelt is unfastened from the package and allowed to be retracted around the takeup shaft, the bent portion 70C reaches the inlet portion 84 due to the arrow C rotation of the cam ring 72, and again enters through the inlet portion 84 into the gutter 82 due to a reaction which the bent portion 70B receives from the pawl 30. As a result, the retractor returns to its normal condition where the takeup shaft can stop its unwinding rotation only in an emergency situation.

Figure 8:
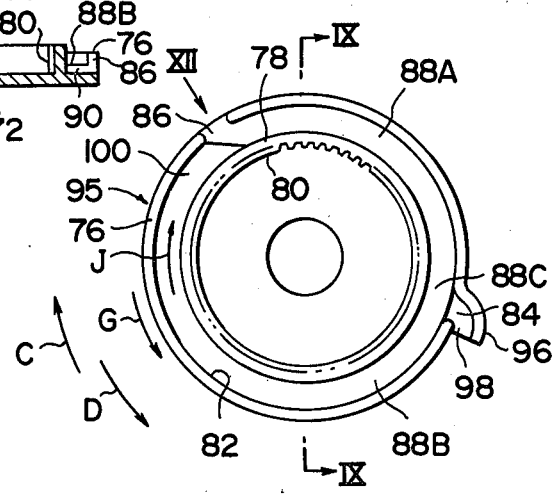
FIG. 8 is a front view showing a cam ring of a second embodiment according to the present invention.
Figure 9:
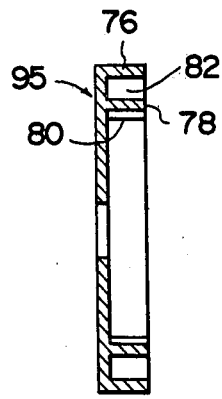
FIG. 9 is a sectional view taken along the line IX—IX in FIG. 8.
Figure 10:
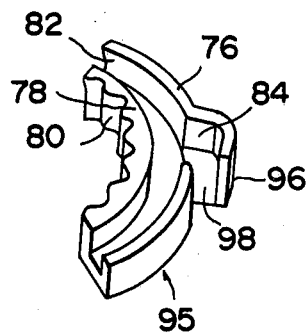
FIG. 10 is a partial perspective view of the cam ring showing an inlet portion thereof.

FIG. 8 shows a second embodiment of the present invention, and particularly another example of the cam ring 95. Similar to the cam ring in the first embodiment the cam ring 95 has inner and outer rings 78 and 76 and an internal gear 80, but has different shapes with respect to inlet and outlet portions 84 and 86.

Figure 11:
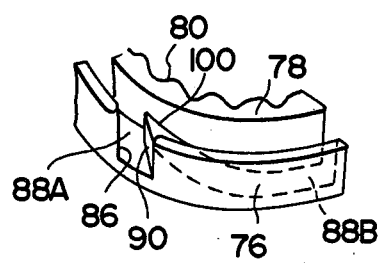
FIG. 11 is a partial perspective view of the cam ring showing an outlet portion thereof.
Figure 12:
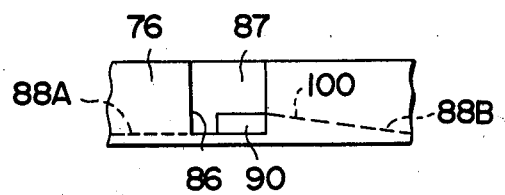
FIG. 12 is a partial elevational view in the direction indicated by arrow XII in FIG. 8.

Provided at the inlet portion 84 is a guide 96 for guiding the bent portion 70C by relatively moving in the direction of arrow G to the axial direction of the cam ring 95. A slope 98 is formed in the guide 96 to smoothly lead the bent portion 70C up to the bottom surface 88C. As also shown in FIG. 11 and 12 in detail, the bottom surface 88B is gradually raised to decrease its depth adjacent to the outlet portion 86 to be the sloping surface 100, and the upper edge of the sloping surface 100 adjoins the bottom surface 88A via the step portion 90. Namely, the bottom surface 88A can be the same depth as the bottom surface 88B. Other features are similar to that of the first embodiment so that the second embodiment functions as the first embodiment.

What is claimed is:

1. A seatbelt retractor for retracting a passenger restraining seatbelt, comprising:
   a takeup shaft around which the seatbelt is wound by a biasing force;
   locking means for stopping the belt-unwinding rotation of said takeup shaft;
   acceleration sensing means for sensing a vehicular emergency situation and operating said locking means; and
   cam means responsive to unwinding of the seatbelt more than a predetermined value from said takeup shaft for operating said locking means to stop belt unwinding rotation of said takeup shaft.

2. A seatbelt retractor as set forth in claim 1, wherein said locking means comprises:
   a ratchet wheel fixed on said takeup shaft and rotatable with said takeup shaft; and
   a pawl opposed to said ratchet wheel and engageable with said ratchet wheel when operated to stop the belt-unwinding rotation of said takeup shaft.

3. A seatbelt retractor as set forth in claim 2, wherein said pawl is connected to said acceleration sensing means, said acceleration sensing means comprising a pendulum actuated by a vehicular acceleration more than a predetermined value.

4. A seatbelt retractor for retracting a passenger restraining seatbelt, comprising:
   a takeup shaft around which the seatbelt is wound by a biasing force;
   locking means for stopping the belt-unwinding rotation of said takeup shaft;
   acceleration sensing means for sensing a vehicular emergency situation and operating said locking means;
   cam means responsive to unwinding of the seatbelt more than a predetermined value from said takeup shaft for operating said locking means to stop belt unwinding rotation of said takeup shaft;
   said cam means comprising:
   a cam member rotated by said takeup shaft; and
   a follower member actuated by said cam member to move said pawl into the engagement with said ratchet wheel when said takeup shaft rotates for releasing the seatbelt more than the predetermined value.

5. A seatbelt retractor as set forth in claim 4, wherein said cam member has substantially a first and second guide portions for said follower member, and said follower member is guided by said first guide portion when the seatbelt is unwound within the predetermined value from said takeup shaft and said follower member is guided by said second guide portion when the seatbelt is unwound more than the predetermined value from said takeup shaft.

6. A seatbelt retractor as set forth in claim 5, wherein said first guide portion is a circular gutter defined by outer and inner rings on said cam member and said second guide portion is an outer periphery of said outer ring.

7. A seatbelt retractor as set forth in claim 6, further comprising inlet and outlet portions on said outer ring, said inlet and outlet portions being communicating said circular gutter with said outer periphery of said outer ring, whereby said follower member continuously follows said first and second guide portions through said inlet and outlet portions.

8. A seatbelt retractor as set forth in claim 7, wherein said circular gutter has a step portion at said outlet portion, said step portion guiding said follower member from said circular gutter to said outer periphery of said outer ring.

9. A seatbelt retractor as set forth in claim 8, wherein said circular gutter comprises shallower and deeper gutters, and said shallower and deeper gutters meet each other via said step portion at said outlet portion.

10. A seatbelt retractor as set forth in claim 9, wherein said shallower and deeper gutters meet each other via a gradual slope at said inlet portion.

11. A seatbelt retractor as set forth in claim 7, further comprising an inlet gate protruding from said outer periphery of said outer ring at said inlet portion, said inlet gate being adapted to guide said follower member from said outer periphery of said outer ring to said circular gutter.

12. A seatbelt retractor as set forth in claim 4, wherein said follower member comprises a linear resilient member, one end of which is opposed to said cam member and the other end of which is opposed to said pawl.

13. A seatbelt retractor as set forth in either one of claim 1, wherein the predetermined value of the unwound seatbelt from said takeup shaft is defined by a value necessary to fasten the seatbelt around an occupant.

14. A seatbelt retractor for retracting a seatbelt to be fastened around an occupant in a motor vehicle, said seatbelt retractor having a frame fixed on a vehicle body, comprising:
   a takeup shaft rotatably supported by the frame, around said takeup shaft the seatbelt being wound by a biasing force;
   a ratchet wheel fixed on said takeup shaft and rotatable with said takeup shaft;
   a pawl movably supported by the frame and opposed to said ratchet wheel, said pawl being engageable with said ratchet wheel when operated to stop the belt-unwinding rotation of said takeup shaft;
   acceleration sensing means for sensing a vehicular acceleration to be more than a predetermined value and moving said pawl into engagement with said ratchet wheel;
   a cam member rotatably supported by the frame and rotated by said takeup shaft, rotation of said cam member corresponding to the unwound value of the seatbelt from said takeup shaft; and
   a follower member following said cam member and opposed to said pawl, said follower member being actuated by said cam member to move said pawl into the engagement with said ratchet wheel and stop the belt-unwinding rotation of said takeup shaft when the seatbelt is unwound more than a predetermined value,
   whereby when the seatbelt is unwound within the predetermined value, said acceleration sensing means stops the belt-unwinding rotation of said takeup shaft by sensing the vehicular acceleration and when the seatbelt is unwound more than the predetermined value, said follower member actuated by said cam member automatically stops the belt-unwinding rotation of said takeup shaft.

* * * * *

REEXAMINATION CERTIFICATE (2832nd)

United States Patent [19]

[11] B1 4,436,255

Matsui et al.

[45] Certificate Issued Apr. 9, 1996

[54] SEATBELT RETRACTOR

[75] Inventors: Kenji Matsui, Higashikamo; Fuminori Teraoka, Nishikamo, both of Japan

[73] Assignee: Kabushiki Kaisha Tokai-Rika-Denki-Seisakusho, Aichi, Japan

Reexamination Requests:
No. 90/003,731, Feb. 17, 1995
No. 90/003,880, Jun. 15, 1995

Reexamination Certificate for:
Patent No.: 4,436,255
Issued: Mar. 13, 1984
Appl. No.: 339,707
Filed: Jan. 15, 1982

[30] Foreign Application Priority Data

Jan. 20, 1981 [JP] Japan ................... 56-7152 U

[51] Int. Cl.⁶ .................................... B60R 22/415
[52] U.S. Cl. .................... 242/382.2; 242/382.4; 242/384.5
[58] Field of Search ............ 242/382.2, 382.4, 242/383.4, 384.5; 280/806; 297/478

[56] References Cited

U.S. PATENT DOCUMENTS 2,899,146  8/1959  Barecki .
3,482,799  12/1969  Wrighton et al. .
3,632,058  1/1972  Stoffel et al. .
3,635,419  1/1972  Pringle .

*Primary Examiner*—John M. Jillions

[57] ABSTRACT

A seatbelt retractor for use in a motor vehicle to retract a passenger restraining seatbelt to be fastened around an occupant. The seatbelt is wound around a rotatable takeup shaft in layers by a biasing force in the seatbelt retractor. Fixed on the takeup shaft is a ratchet wheel, and a pawl is opposed to the ratchet wheel, whereby when the pawl meshes with the ratchet wheel, and thereby stops the belt-unwinding rotation of the takeup shaft. An inertia lock mechanism is provided in the retractor to actuate the pawl to mesh with the ratchet wheel in a vehicular emergency situation. A cam mechanism is also provided in the retractor, which includes a cam member or ring rotated by the takeup shaft and a follower member or linear spring driven by the cam member and opposed to the pawl. The cam member actuates the follower member to move the pawl into enagement with the ratchet wheel when the seatbelt is unwound more than a predetermined value, namely a value necessary for the fastening of the seatbelt. When the seatbelt is unwound within the predetermined value from the takeup shaft, the takeup shaft is kept rotatable in either direction and its belt-unwinding rotation is stopped by the inertia lock mechanism during a vehicular emergency situation. When the seatbelt is unwound more than the predetermined value, the takeup shaft is automatically stopped in its belt-unwinding rotation by the cam mechanism.

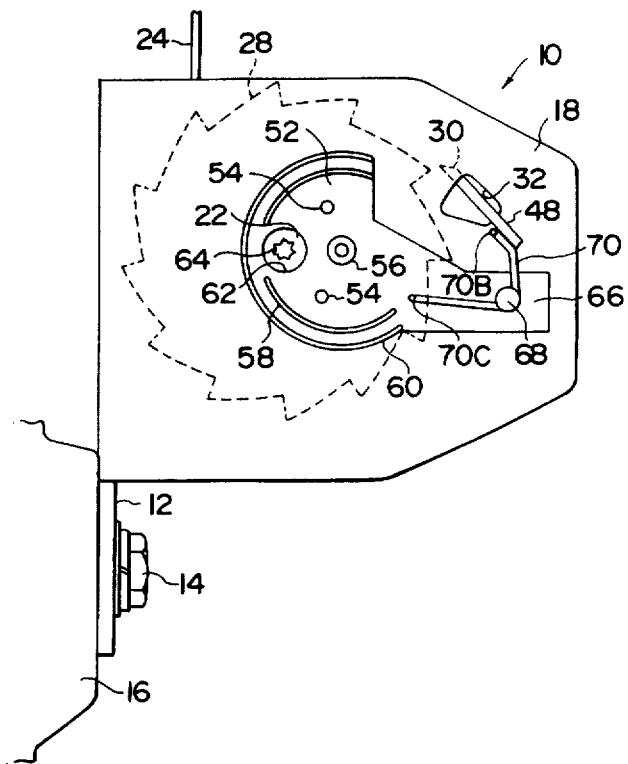

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 49–58:

A pair of brackets 18 and 20 extending from both ends of the frame 12 in parallel, where substantially opposite ends of a takeup shaft 22 are rotatably supported. An occupant restraining webbing or seatbelt 24 is wound around the central portion of the takeup shaft [24] *22* in layers. The other end of the seatbelt, though not shown, is connected to the other part of the vehicle body through a tongue plate, buckle, and so forth, so that the intermediate portion of the seatbelt is placed over an occupant.

Column 5, lines 27–45:

In order to secure the movement of the bent portion 70C, the linear spring 70 is designed such that the bent portion 70C is biased toward the bottom surface of the gutter 82, namely in the direction of receding from the bracket 18. Furthermore, although the linear spring 70 is also designed to facilitate the entering of the bent portion 70C through the inlet portion 84 into the gutter 82 by a biasing force as shown by arrow E, the linear spring 70 can be free from any force and does not push the pawl 30 once the bent portion 70C is in the gutter 82. The relative placement between the cam ring 72 and the takeup shaft 22 is such that when the seatbelt 24 is wound around the takeup shaft to a maximum extent, the bent portion 70C is located on the bottom surface 88A. When the seatbelt is [wound] *unwound* to an extent more than a value necessary to fasten the seatbelt 24 around the passenger, the bent portion 70C falls down onto the bottom surface 88A from the bottom surface 88B through the step portion 90.

AS A RESULT OF REEXAMINATION, IT HAS BEEN DETERMINED THAT:

The patentability of claim 14 is confirmed.

Claims 1, 4 and 13 are determined to be patentable as amended.

Claims 2–3, 5–12, dependent on an amended claim, are determined to be patentable.

New claims 15 and 16 are added and determined to be patentable.

1. A seatbelt retractor for retracting a passenger [retraining] *restraining* seatbelt, comprising:

a takeup shaft around which the seatbelt is wound by a biasing force;

locking means for stopping the belt-unwinding rotation of said takeup shaft *in response to a predetermined amount of acceleration and in response to a predetermined amount of unwinding of the seatbelt*;

acceleration sensing means for sensing *the predetermined amount of acceleration indicating* a vehicular emergency situation and operating said locking means; and cam means responsive to unwinding of the seatbelt more than [a] *the* predetermined [value] *amount* from said takeup shaft for operating said locking means to *automatically* stop belt unwinding rotation of said takeup shaft *and continuing to be responsive during at least one rotation of said takeup shaft in its winding direction*.

4. A seatbelt retractor for retracting a passenger restraining seatbelt, comprising:

a takeup shaft around which the seatbelt is wound by a biasing force;

locking means for stopping the belt-unwinding rotation of said takeup shaft *including a ratchet wheel fixed on said takeup shaft and rotatable with said takeup shaft, and a pawl opposed to said ratchet wheel and engageable with said ratchet wheel when operated to stop the belt-unwinding rotation of said takeup shaft*;

acceleration sensing means for sensing a vehicular emergency situation and operating said locking means; *and* cam means responsive to unwinding of the seatbelt more than a predetermined value from said takeup shaft for operating said locking means to stop belt unwinding rotation of said takeup shaft[;]*,*

*wherein* said cam means [comprising:] *comprises:* a cam member rotated by said takeup shaft; and a follower member actuated by said cam member to [move] *contact* said pawl *and move said pawl* into [the] engagement with said ratchet wheel when said takeup shaft rotates for releasing the seatbelt more than the predetermined value.

13. A seatbelt retractor as set forth in [either one of] claim 1, wherein the predetermined [value] *amount* of the unwound seatbelt from said takeup shaft is defined [by] *as a value greater than* a value necessary to fasten the seatbelt around an occupant.

*15. A seatbelt retractor for retracting a passenger restraining seatbelt, comprising:*

*a takeup shaft around which the seatbelt is wound by a biasing force;*

*acceleration sensing means for sensing an amount of acceleration of a vehicle; and*

*a locking mechanism functioning as an inertial locking mechanism to stop seatbelt unwinding rotation of said takeup shaft in response to a predetermined amount of acceleration sensed by said acceleration sensing means and functioning as an automatic stop mechanism;*

*cam means for switching said locking mechanism from the inertial locking mechanism to the automatic stop mechanism in response to unwinding of the seatbelt more than a predetermined value from said takeup shaft, said locking mechanism continuing to function as the automatic stop mechanism by automatically stopping seatbelt unwinding rotation of said takeup shaft, and continuing to be responsive during at least one rotation of said takeup shaft in its winding direction.*

*16. A seatbelt retractor for retracting a passenger restraining seatbelt, comprising:* a takeup shaft around which the seatbelt is wound by a biasing force;

acceleration sensing means for sensing an amount of acceleration of a vehicle;

a locking mechanism functioning as an inertial locking mechanism to stop belt unwinding rotation of said takeup shaft in response to a predetermined amount of acceleration sensed by said acceleration sensing means and functioning as an automatic stop mechanism, said locking mechanism including a ratchet wheel fixed on said takeup shaft and rotatable with said takeup shaft, and a pawl opposed to said ratchet wheel and engageable with said ratchet wheel when operated to stop the belt-unwinding rotation of said takeup shaft; and cam means for switching said locking mechanism from the inertial locking mechanism to the automatic stop mechanism in response to unwinding of the seatbelt more than a predetermined value from said takeup shaft, said locking mechanism continuing to function as the automatic stop mechanism even after the unwound amount of the seatbelt from said takeup shaft falls to less than the predetermined value during belt-winding rotation of said takeup shaft, wherein said cam means comprises a cam member rotated by said takeup shaft; and a follower member actuated by said cam member to move said pawl into engagement with said ratchet wheel fixed on said takeup shaft when said takeup shaft rotates for unwinding the seatbelt more than the predetermined value.

* * * * *